(12) United States Patent
Maeda et al.

(10) Patent No.: US 7,940,627 B2
(45) Date of Patent: May 10, 2011

(54) DATA RECORDING DEVICE, DATA RECORDING METHOD, AND COMPUTER PROGRAM

(75) Inventors: Tetsuhiro Maeda, Kanagawa (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 421 days.

(21) Appl. No.: 11/994,653

(22) PCT Filed: Apr. 10, 2007

(86) PCT No.: PCT/JP2007/057908
§ 371 (c)(1),
(2), (4) Date: May 27, 2008

(87) PCT Pub. No.: WO2007/129523
PCT Pub. Date: Nov. 15, 2007

(65) Prior Publication Data
US 2008/0247281 A1    Oct. 9, 2008

(30) Foreign Application Priority Data

May 8, 2006  (JP) .................................. 2006-129122

(51) Int. Cl.
*G11B 7/00*  (2006.01)
(52) U.S. Cl. ................. 369/59.26; 369/47.27; 369/47.55
(58) Field of Classification Search ................ 369/47.55
See application file for complete search history.

(56) References Cited

U.S. PATENT DOCUMENTS

| 7,313,066 B2* | 12/2007 | Hwang et al. | 369/53.17 |
| 2003/0026186 A1* | 2/2003 | Ando et al. | 369/53.24 |
| 2004/0174793 A1* | 9/2004 | Park et al. | 369/59.25 |

FOREIGN PATENT DOCUMENTS

| JP | 2000 112832 | 4/2000 |
| JP | 2005 243120 | 9/2005 |

OTHER PUBLICATIONS

U.S. Appl. No. 11/994,918, filed Jan. 7, 2008, Maeda et al.

* cited by examiner

*Primary Examiner* — Lixi Chow
(74) *Attorney, Agent, or Firm* — Oblon, Spivak, McClelland, Maier & Neustadt, L.L.P.

(57) ABSTRACT

It is possible to manage an empty region in a disc partition while satisfying an inhibit matter of the ROM standard not recording a space bit map describer (SBD). The SBD is recorded upon disc initialization and additional recording into the partition is performed by using the SBD regardless of the access type in the device. When ejecting the disc, pointer information to the SBD recorded in the partition describer (PD) is hacked up in the SBD pointer information save file or save data and then the pointer information is erased. Upon disc recognition, the existence of the save file/data is confirmed and the SBD is restored.

8 Claims, 11 Drawing Sheets

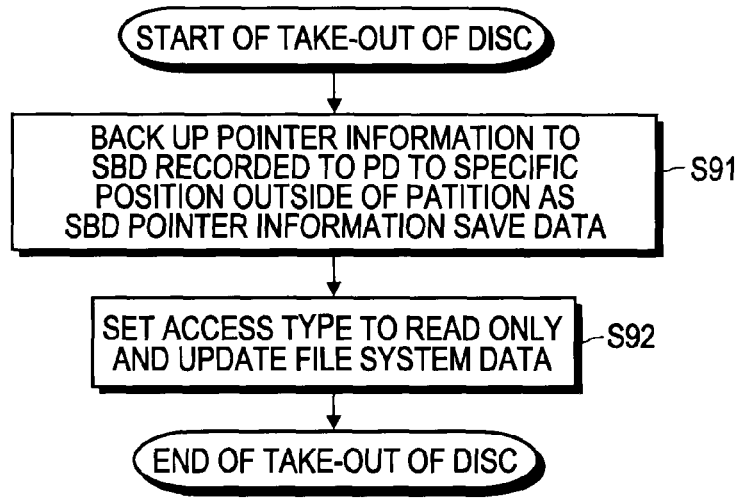
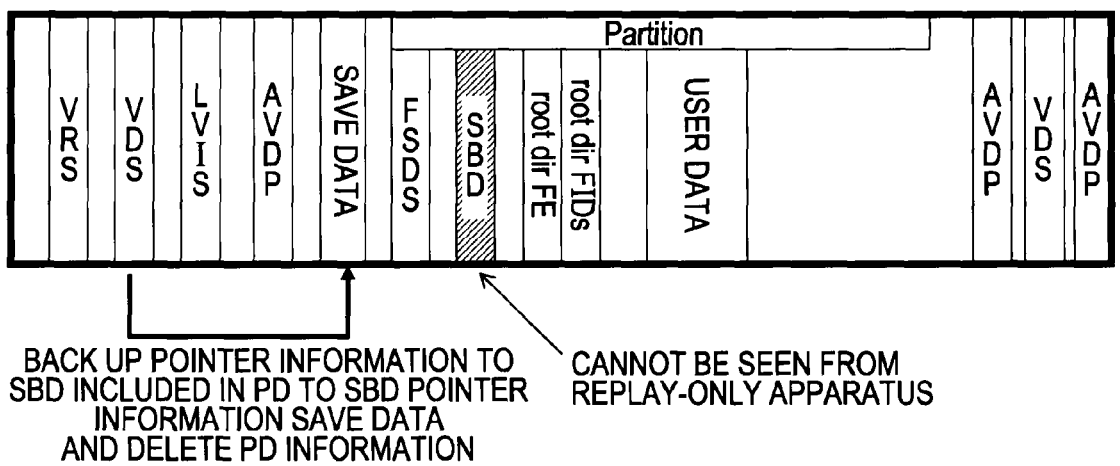

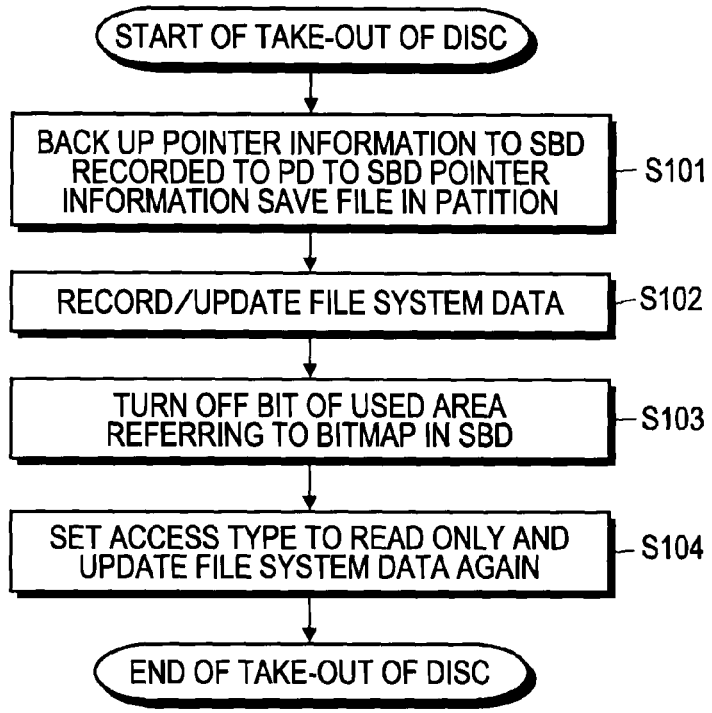
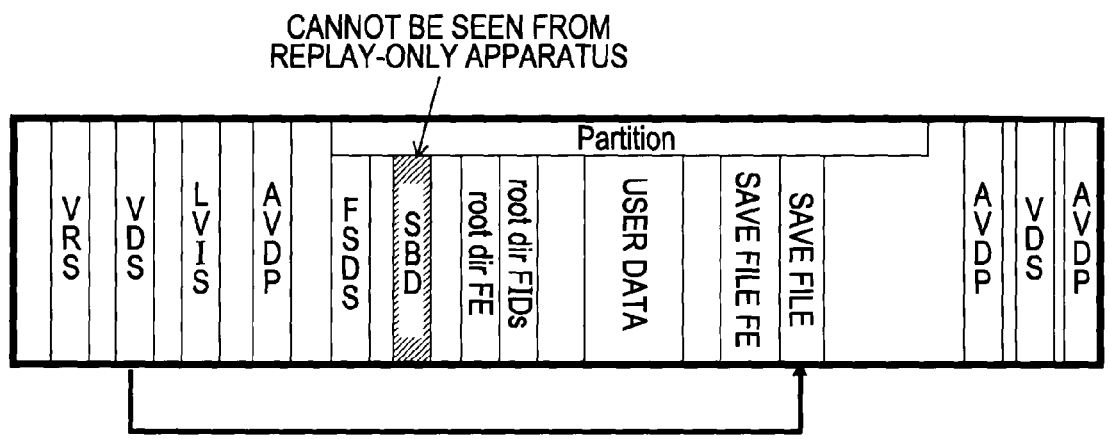

RESTORE INFORMATION TO SBD, WHICH IS INCLUDED IN PD AND BACKED UP TO SBD POINTER INFORMATION SAVE FILE, TO NORMAL POSITION

CAN BE REFERRED TO AGAIN

CAN BE REFERRED TO AGAIN

RESTORE INFORMATION TO SBD, WHICH IS INCLUDED IN PD AND BACKED UP TO SBD POINTER INFORMATION SAVE FILE, TO NORMAL POSITION

DATA RECORDING DEVICE, DATA RECORDING METHOD, AND COMPUTER PROGRAM

TECHNICAL FIELD

The present invention relates to a data recording apparatus, a data recording method, and a computer program for recording data on a recording medium, and to a data recording apparatus, a data recording method, and a computer program for recording data on a data overwritable optical disc, for example, DVD-RW, DVD+RW, and CD-RW.

More specifically, the present invention relates to a data recording apparatus, a data recording method, and a computer program for recording data on overwritable recording medium in a format according to UDF (Universal Disk Format) (registered trademark) defined by the OSTA (Optical Storage Technology Association), and more particularly relates to a data recording apparatus, a data recording method, and a computer program for recording data on overwritable recording medium in a state in which the data can be replayed by a replay only apparatus.

BACKGROUND ART

Disc type recording media (hereinafter referred to as "optical disc") such as DVD (Digital Versatile Disc) and CD (Compact Disc) to which optical reading is applied have rapidly become widespread as an application for storing a computer-file and a moving image stream. An optical disc has a large memory capacity and can be accessed at random. Further, the optical disc has no possibility of the wear and corruption of a recording surface due to reading, a head-crush, and the like different from a contact type magnetic recording medium. Further, the disc surface is strong and has a low degree of danger of incidentally losing data. Recently, the optical disc is widely used as an external recording medium for a computer and as an external memory device.

For example, UDF (Universal Disk Format) (registered trademark) defined by the OSTA (Optical Storage Technology Association) is known as an optical disc-format with high compatibility (refer to, for example, Non-Patent Document 1). UDF corresponds to a mounting technology of ISO/IEC 13346 standard which is also known as ECMA-167 (refer to, for example, Non-Patent Document 2) (ISO/IEC 13346 is a successor of ISO 9660 corresponding to an increase of a disc capacity and the number of files). In the 1990s, UDF became widespread as an application of a writable optical disc as the cost of a CD-RW medium and a CD recording apparatus is reduced.

UDF can execute processing for adding and deleting a file to an optical disc through an ordinary file system by employing a packet write system. The packet write system, to which reference is made here, writes data as a packet structure by providing a link block and four Run-In areas in front of user data as well as providing two Run-Out areas at the end of the user data. Seven blocks are used as a linking area which is a joint area between adjacent packets in addition to a user data area. UDF is a file system to which data can be written from almost all the operating systems (OS) as well as a file written thereto can be compatibly replayed on the operating systems without a special read program and can manipulate the contents in an optical disc by a method similar to a hard disc, floppy disc, USB (Universal Serial Bus) flash memory.

UDF defines four types of accesses, 1: Read Only, 2: Write Once, 3: Rewritable, and 4: Overwritable are prescribed as the accesses of an optical disc. Among them, when user data is recorded to a type 4 overwritable optical disc of according to UDF, there is exemplified a method of using a space bitmap descriptor (SBD), in which an unused status of each area is described by a bitmap format, to manage a space area in a partition for recording file data (refer to, for example, Patent Document 1).

Although SBD can be optionally disposed in a partition, a partition descriptor (PD), in which point information is described to point out the location of SBD, is described in a volume descriptor sequence (VDS) which describes information as to the contents of a volume structure. Although VDS can be also optionally disposed in an area outside of a partition, AVDP (Anchor Volume Descriptor Pointer) composed of point information for pointing out VDS is defined. Accordingly, SBD can be referred to through AVDP, VDS, and PD.

Here, when user convenience is taken into consideration, it is preferable to sequentially take out a recording medium on which data is overwritten according to UDF from a disc recording apparatus and to replay it also by a replay only apparatus. This is, for example, to take out a still image, moving image, and the like picked up by a digital camera and recorded to a DVD, to display and output images by loading the DVD on a DVD player, and to record picked up images by loading the DVD on the digital camera again.

However, in a UDF format of the version number 2.5 and later, since it is prohibited to record SBD in an optical disc having the access type 1, that is, in an Read Only optical disc, a problem arises in that a type 4 disc has no compatibility between a data recording apparatus and a replay only apparatus.

[Patent Document 1] Japanese Unexamined Patent Application Publication No. 2000-112832
[Non-Patent Document 1] http://www.osta.org/specs/index.htm
[Non-Patent Document 2] http://www.ecma-international.org/publications/standards/Ecma-167.htm

DISCLOSURE OF THE INVENTION

Problems to be Solved by the Invention

An object of the present invention is to provide an excellent data recording apparatus, data recording method, and computer program capable of recording data on an overwritable optical disc such as a DVD-R/W, DVD+RW, CD-RW, and the like which can overwrite data.

Another object of the present invention is to provide an excellent data recording apparatus, data recording method, and computer program capable of preferably recording data to an overwritable recording medium to which data can be overwritten in a format according to UDF defined by OSTA.

Still another object of the present invention is to provide an excellent data recording apparatus, data recording method, and computer program capable of recording data to an overwritable recording medium in a state that the data can be replayed by a replay only apparatus.

Yet still another object of the present invention is to provide an excellent data recording apparatus, data recording method, and computer program capable of preferably recording data to an overwritable optical disc while preferably managing a space area in a partition of the disc according to a prohibition of a read-only optical disc which prohibits to record a space bitmap descriptor (SBD).

Means for Solving the Invention

A first aspect of the present invention, which was made in consideration of the above problems, is to provide a data recording apparatus for executing overwrite to a disc having a partition on which a file can be overwritten according to a predetermined file system format, wherein, in the predetermined file system format, it is permitted to record space area description information, which manages a space area in a partition when the overwrite is used, in the partition as well as it is prohibited to record the space area description information in the partition when replay only is used, the data recording apparatus including a disc initialization means for recording the space area description information, which manages the space area in the partition, on the disc when the disc is initialized a data recording means for searching a space area in the partition referring to the space area description information recorded on the and recording file data to the searched space area as well as updating the description information, a space area description information concealing means for concealing the space area description information so as to be used for replay only, and a disc discrimination means for detecting whether or not a disc is overwritable when the disc is loaded and determining whether or not overwrite can be executed making use of the space area description information.

The present invention relates to a data recording apparatus for overwriting data to a recording medium such as an overwritable optical disc, for example, DVD-RW, DVD+RW, CD-RW based on, for example, a file system according to UDF defined by OSTA.

When user data is recorded to an overwritable optical disc according to UDF, there is exemplified a method of using a space bitmap descriptor (SBD), in which the unused state of each area is described by a bitmap format, to manage a space area in a partition to which file data is recorded.

Here, when user convenience is taken into consideration, it is preferable to sequentially take out a recording medium on which data is overwritten according to UDF from a disc recording apparatus and to replay it also by a replay only apparatus. However, in a UDF format of the version number 2.5 and later, since it is prohibited to record SBD in an optical disc whose access type is 1, that is, in an Read Only optical disc, a problem arises in that a type 4 disc has no compatibility between the data recording apparatus and a replay only apparatus.

To cope with this problem, the data recording apparatus according to the present invention is arranged such that when user data is overwritten to a recording medium, for example, an overwritable optical disc and the like such as DVD-RW, DVD+RW, CD-RW according to UDF, the user data is overwritten while managing a space area by a format which does not conflict with the prohibition of the UDF format of the version number 2.5 and later.

In the data recording apparatus according to the first aspect of the present invention, when the disc is initialized, space area description information for managing a space area in a partition is recorded on the disc, the space area in the partition is searched referring to the space area description information, and the file data is recorded. However, when the disc is discharged, conflict with the prohibition of the UDF format of 2.5 and later is prevented by concealing the space area description information so that the disc can be used in a replay only apparatus. Further, when the disc is loaded, whether or not the disc is overwritable is detected to thereby determine whether or not an overwrite can be executed making use of the space area description information.

Specifically, when the data recording apparatus according to the first aspect of the present invention overwrites the user data to a recording medium such as an overwritable optical disc, for example, DVD-RW, DVD+RW, CD-RW according to UDF, a space area description file for managing the space area in the partition is uniquely created in the partition or space area description data for managing the space area in the partition is uniquely created outside of the partition.

Then, when an optical disc is loaded on the apparatus, even if an access type is set to 1, that is, to read only, when the existence of the space area description file or the space area description data is confirmed, it is recognized that the optical disc is an overwritable optical disc, and the user data is overwritten while maintaining the contents of the space area description file or the space area description data.

Therefore, according to the data recording apparatus of the first aspect of the present invention, since the space area in the partition is managed by a format other than SBD, the user data can be overwritten while managing the space area by a format which does not conflict with the prohibition of the UDF format of 2.5 and later.

Otherwise, in the data recording apparatus according to the first aspect of the present invention, when an optical disc is initialized by a format according to UDF, a space bitmap descriptor (SBD) is record. Further, during the period from the time at which an optical disc is loaded on the apparatus to the time at which it is taken out therefrom, the user data is overwritten to the partition making use of the space bitmap descriptor (SBD) regardless of an access type.

Then, when the optical disc is taken out from the apparatus, pointer information to the space bitmap descriptor (SBD) recorded to a partition descriptor (PD) is backupped to a unique SBD pointer information save file in the partition or to a unique SBD pointer information save data outside of the partition and then deleted (from VDS).

Further, when the optical disc is loaded on the apparatus, it is confirmed whether or not the SBD pointer information save file or the SBD pointer information save data, in which the pointer information to the bitmap descriptor (SBD) is backupped, exists when the file system data is recognized, and when the file or the data is detected, the space bitmap descriptor (SBD) is restored as well as the user data is continuously overwritten to the partition while maintaining the space bitmap descriptor (SBD).

In this case, the user data can be overwritten by managing the space area in the partition of the optical disc making use of SBD as well as SBD cannot be seen from the apparatus when the optical disc is taken out, thereby confliction with the prohibition, which prohibits recording of SBD, of the UDF format of the version 2.5 and later is prevented. Further, when the optical disc is loaded on the data recording apparatus according to the present invention again, the user data can be continuously overwritten to the optical disc while maintaining the space area in the partition by restoring SBD.

A second aspect of the present invention is a computer program, which is described in a computer-readable format to execute processing for executing overwrite to a disc having a partition on which a file can be overwritten on a computer according to a predetermined file system, wherein, in the predetermined file system format, it is permitted to record space area description information for managing a space area in the partition when the overwrite is used as well as it is prohibited to record the space area description information in the partition when replay only is used, the computer program causing a computer to execute a disc initialization procedure for recording the space area description information, which manages the space area in the partition, on the disc when the disc is initialized, a data recording procedure for searching a space area in the partition referring to the space area description information recorded on the and recording file data to the searched space area as well as updating the description information, a space area description information concealing procedure for the space area description information so as to be used for replay only and a disc discrimination procedure for detecting whether or not a disc is overwritable when the disc is loaded and determining whether or not overwrite can be executed making use of the space area description information.

The computer program according to the second aspect of the present invention defines a computer program described on the computer in a computer-readable format so that predetermined processing can be realized on the computer. In other words, when the computer program according to the second aspect of the present invention is installed on the computer, a cooperative operation is exhibited on the computer, thereby the same operation/working effect as that of the data recording apparatus according to the first aspect of the present invention can be obtained.

ADVANTAGES OF THE INVENTION

According to the present invention, there can be provided an excellent data recording apparatus, data recording method, and computer program which can preferably overwrite user data to a data-overwritable optical disc such as DVD-RW, DVD+RW in a format according to UDF defined by OSTA.

Further, according to the present invention, there can be provided an excellent data recording apparatus, data recording method, and computer program which can record data to an overwritable optical disc according to a UDF format as well as in a state that it can be replayed by a replay only apparatus.

Further, according to the present invention, there can be provided an excellent data recording apparatus, data recording method, and computer program which can preferably execute recording to an overwritable optical disc by preferably managing a space area in a partition of a disc according to the prohibition of a read only disc which prohibits to record a space bitmap descriptor (SBD).

According to the data recording apparatus of the present invention, the space area of the partition is managed in a format other than SBD or it is managed using SBD while an optical disc is loaded. However, when the optical disc is taken out from the apparatus, since pointer information to SBD is saved such that it can be restored when loaded again. As a result, user data can be overwritten in a format which does not conflict with the prohibition of the UDF format of 2.5 and later.

Further objects, features and advantages of the present invention will become more apparent from the detailed description based on the embodiment of the present invention to be described below and the accompanying drawings.

BRIEF DESCRIPTION OF THE DRAWINGS

FIG. 18 is a flowchart showing a processing procedure for backupping pointer information to SBD recorded to PD in VDS to SBD pointer information save data outside of a partition.

FIG. 19 is a view showing a data layout of a disc when PD is deleted from VDS after PD information is backupped to the SBD pointer information save data outside of the partition.

FIG. 20 is a flowchart showing a processing procedure for backupping the pointer information recorded to PD in VDS to the SBD pointer information save file in the partition.

FIG. 21 is a view showing a data layout of a disc when PD is deleted from VDS after the PD information is backupped to the SBD pointer information save file in the partition.

REFERENCE NUMERALS

Figure 1:
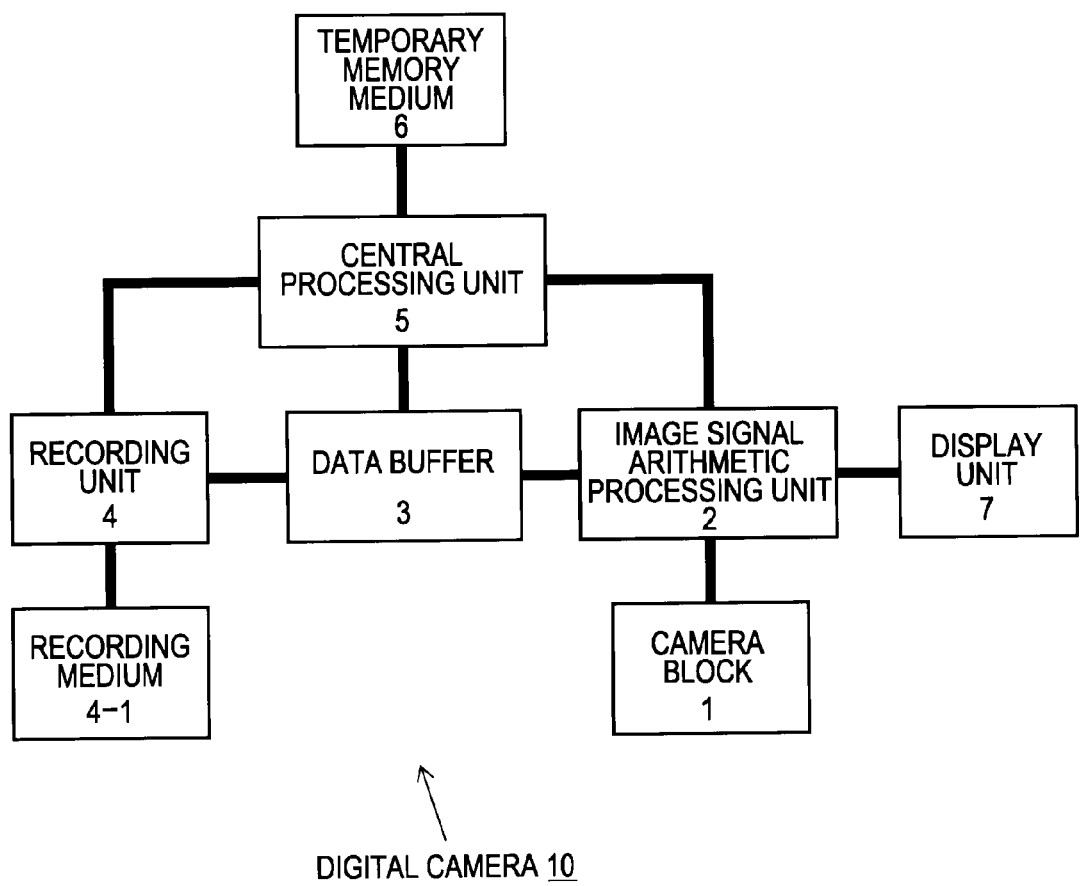
FIG. 1 is a view schematically showing a hardware arrangement of a digital camera 10 according to an embodiment of the present invention.

1 . . . camera block
2 . . . image signal arithmetic processing unit

3 ... data buffer
4 ... recording unit
5 ... central processing unit
6 ... temporary memory medium
10 ... digital camera
13 ... OP unit
14 ... RF processing unit
15 ... servo signal processing unit
16 ... analog filter unit
17 ... signal processing unit
18 ... spindle driver
19 ... thread driver
20 ... tracking driver
21 ... focus driver
22 ... spindle motor
23 ... thread motor
25 ... recording medium (optical disc)

BEST MODE FOR CARRYING OUT THE INVENTION

An embodiment of the present invention will be explained below in detail referring to the drawings.

A. Arrangement of Apparatus:

A data recording apparatus according to the present invention overwrites data to a recording medium such as an overwritable optical disc, for example, DVD-RW, DVD+RW, CD-RW and the like a plurality of times based on a file system according to UDF defined by OSTA, and a digital camera, which digitalizes an image captured by a solid-state image pickup device, can be exemplified as an arrangement example of one typical apparatus.

FIG. 1 schematically shows a hardware arrangement a digital camera 10 according to the embodiment of the present invention.

A camera block 1 for picking up a subject is composed of a lens for capturing an image of the subject, a solid-state image pickup device such as CCD (Charge Coupled Device), CMOS (Complementary Mental-Oxide Semiconductor), and the like for creating an electric image signal by photoelectric conversion according to an input amount of light, an A/D converter for converting an image signal to a digital image signal, and a demosaic processing unit (not shown) for calculating RGB signals from the digital image signal, and the like.

An image signal arithmetic operation processing unit 2 executes color reference conversion from the RGB signals to color difference and luminance signals and coding/compression processing to the format of JPEG and MPEG, and the like. Further, the image signal arithmetic operation processing unit 2 supplies a processed image signal to a display unit 7 composed of a liquid crystal display (LCD) and the like and outputs an image.

A recording unit 4 receives an image file, which is coded and compressed by the image signal arithmetic operation processing unit 2, through a data buffer 3 and records it to a recording medium 4-1 such as an optical disc and the like being loaded. In the embodiment, although data is overwritten to the recording medium a plurality of times based on a file system according to UDF defined by OSTA, this will be described later in detail.

A central processing unit 5 loads an execution program on a temporary memory medium 6 composed of a RAM (Random Access Memory) and the like as well as integrally controls the processing operation of the digital camera 10 in its entirety by executing the program under the execution environment provided by OS while temporarily storing a system parameter and an environment parameter. The processing operation, to which reference is made, includes picking up of a moving image executed by the camera block 1, a camera work accompanied thereto such as an automatic focusing function, an automatic exposure, an image stabilization, an automatic shutter, and the like, recording of data to the recording medium 4-1 in the recording unit 4, and the like.

Figure 2:
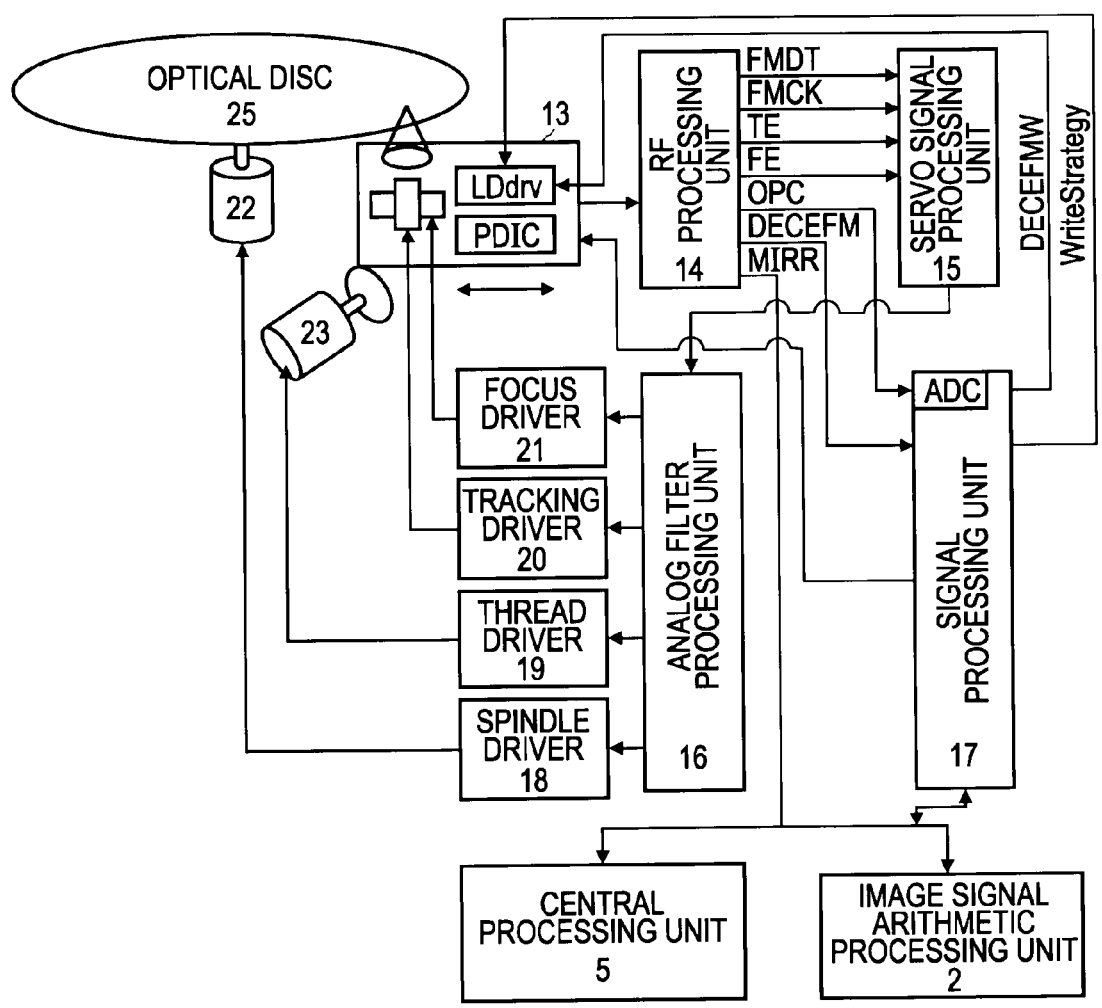
FIG. 2 is a view showing an internal hardware arrangement of a recording unit 4.

FIG. 2 shows an internal hardware arrangement of the recording unit 4.

An OP (Optical Pickup) unit 13 is composed of an objective lens, a laser diode (LD), a laser diode driver (LDdrv), a photo detect IC, a half-mirror, and the like. When data is replayed, a reflected light signal from a recording surface of an optical disc 25 in response to laser light irradiated thereto is detected and output to an RF processing unit 14. Further, when data is recorded, it is written to the optical disc 25 based on a laser blinking-drive signal (DECEFMW) necessary to form pits from a signal processing unit 17, a light strategy signal showing the optimum values of laser intensity and blinking, and the like. The light strategy is a technology for correcting the time direction and the level direction of a laser pulse of each bit when data is written so that a pit size satisfies a standard after the data is written.

The RF processing unit 14 subjects the eight systems of signals, which are detected from the OP unit 13 and composed of a beam signal, a side, and a main, to an arithmetic operation processing while sampling and holding them and creates FE (focus error), TE (tracking error), MIRR (mirror), ATIP (Absolute Time In Pregroove), a read-out main signal, and the like from predetermined signals of the eight systems of the signals. The RF processing unit 14 outputs FMDT (frequency modulation data), FMCK (frequency modulation clock), TE, and FE in the created signals to the servo signal processing unit 15, outputs the optimum value (OPC: Optical Power Calibration) signal of laser intensity, and a laser blinking/drive signal, which are detected by trial write, to the signal processing unit 17 and outputs MIRR to the central processing unit 5.

When a servo signal processing unit 15 is input with FMDT, FMCK, TE, and FE from the RF processing unit 14, it creates various servo control signals specific to the optical disc in response to an instruction from the central processing unit 5 and outputs them to an analog filter processing unit 16.

The analog filter processing unit 16 creates an analog signal based on various servo control signals from the servo signal processing unit 15 and outputs it to a spindle driver 18, a thread driver 19, a tracking driver 20, and a focus driver 21.

The signal processing unit 17 is input with OPC and DECEFM from the RF processing unit 14 under the control of the central processing unit 5 and executes processings such as CIRC (Cross Interleave Reed-Solomon Code) decode and encode, light strategy, ADDr decode, asymmetry, running OPC, and the like. Further, when data is written to the optical disc 25, the signal processing unit 17 outputs signals such as the laser blinking/drive signal and the signal showing the optimum value of the laser intensity to the OP unit 13.

The spindle driver 18 controls the rotation of a spindle motor 22 based on a signal from the analog filter processing unit 16. Then, the spindle motor 22 rotates the optical disc 25 based on a signal from the spindle driver 18.

The thread driver 19 controls a thread operation of a thread motor 23 based on a signal from the analog filter processing unit 16. Then, the thread motor 23 executes the thread operation of the OP unit 13 based on a signal from the thread driver 19.

The tracking driver 20 controls the position of a beam spot irradiated onto a recording surface of the optical disc 25 by swinging the OP unit 13 based on a signal from the analog filter processing unit 16.

The focus driver 21 controls the focus adjustment of laser by moving the OP unit 13 in a vertical direction with respect to the recording surface of the optical disc 25 based on a signal from the analog filter processing unit 16.

Although the central processing unit 5 uses the temporary memory medium 6 as a work memory (described above), it stores file system data as to a UDF file system, which is updated each time, for example, a file and directory are updated, added, deleted, and the like until just before a main power supply of the apparatus 1 is turned off.

When data is read out from the optical disc 25, the light of the laser diode reflected from the recording surface is read by a lens optical system of the OP unit 13. The light from the lens optical system is converted into an electric signal by PDIC and sampled and held in the RF processing unit 14, and the signals such as the FE, TE, MIRR, ATIP, read-out main signal and the like are created from the respective eight signals by arithmetic operation processing.

First, the FE, which is obtained by the RF processing unit 14, is input to the focus driver 21 through the analog filter processing unit 16 after the characteristics thereof are adjusted by the servo signal processing unit 15. The focus driver 21 moves a lens drive focus coil (not shown) of the OP unit 13 in an up/down direction and corrects focusing offset.

Further, the TE, which is obtained by the RF processing unit 14, is input to the tracking driver 20 through the analog filter processing unit 16 after the AC component of thereof is removed by the servo signal processing unit 15 and the TE is subjected to a digital filter processing. The tracking driver 20 minutely moves a lens drive tracking coil of the OP unit 13 in a radial direction so as to correct the tracking offset.

Further, the TE, which is obtained by the RF processing unit 14, is input to the thread driver 19 through the analog filter processing unit 16 after the DC component thereof is removed by the servo signal processing unit 15 and the TE is subjected to a digital filter processing. The thread driver 19 drives the thread motor, moves the OP unit 13 in its entirety in the diameter direction of the recording medium to thereby correct the offset of a thread operation. In a seek operation, the thread motor is forcibly driven by intentionally applying a thread control voltage from the outside.

As described above, the tracking operation, in which only the lens is minutely driven in the radial direction, is executed based on the AC component of TE as well as the thread operation for moving the OP unit 13 in its entirety in the diameter direction is executed based on the DC component of TE.

Since the detection signal (mirrors) of the change of reflectance of the recording medium output from the RF processing unit 14 is detected when the OP unit 13 traverses a track, a seek position and a read position at the time are detected and an optical pick-up operation is started and ended by counting the mirrors.

The spindle motor 22 is controlled based on ATIP processing. Time information is recorded to a meandering groove called a Wobble groove written to the optical disc 25 by an FM modulation of +/−1 KHz having a central frequency of 22.05 KHz in a radial direction. What is modulated is time information called Bi-Phase modulated ATIP.

When focusing agrees with tracking, a Wobble signal is fetched from a predetermined combination of the input eight signals in the RF processing unit 14. The Wobble signal is subjected to FM demodulation and ATIP decoding and fetched as FMCK and FMDT. FMDT is stored to an absolute time position of the optical disc 25, that is, to a predetermined register which is classified as an address and other additive information, and data is read out according to it.

The RF processing unit 14 fetches a signal corresponding to a record pit from the predetermined combination of the eight signals and subjects the signal to equalization processing and then supplies the signal to the signal processing unit 17 while keeping the format of EFM (Eight to Fourteen Modulation) signal as it is. The signal processing unit 17 can obtain desired data by executing decoding based on CIRC.

On the other hand, when data is written to the optical disc 25, first, a pick-up is moved to a lead-in area and reads out ATIP information. Further, a part of special information is read out from the ATIP information, thereby the start position of the lead-in area is found. the start position is ordinarily stored as time information. The information written to the special information corresponds to the individual identification code of the optical disc 25. The apparatus 1 previously stores a light strategy parameter corresponding to the individual identification code and other relating parameter as a table. The correction parameter is previously prepared to each recording medium.

Next, OPC (Optical Power Calibration) operation is executed to determine the optimum value of a laser output. OPC is an operation for calculating an overall optimum value in contrast that the light strategy described above is a minute control of laser of each write pit. A write setting value corresponding to an ideal read target value is obtained by executing OPC.

Data is written in such a manner that the picked-up and compressed image data prepared in the data buffer 3 is input to a laser-driver (LDdrv) of the OP unit 13 as the laser blinking/drive signal (DECEFMW) necessary to form a pit and the light strategy signal (WriteStrategy) after the image data is subjected to CIRC and EFM coding processing. At the time, the data is written at a timing corresponding to a predetermined position through a file system using an address of a frame unit, which is obtained from an FMDT signal obtained by decoding ATIP, as a reference. Data begins to be written first from a position which skips an area of about 20 megabytes which acts as a lead-in area in a subsequent close session.

B. Overwrite Operation to Optical Disc:

In the data recording apparatus 1 according to the embodiment, although data is recorded to the optical disc 25 based on the file system according to UDF defined by OSTA, the data recording apparatus 1 has a feature in that it executes overwrite recording to an overwritable recording medium such as DVD-RW, DVD+RW, CD-R, and the like while securing compatibility between the apparatus 1 and a replay only apparatus for disc.

When user data is recorded to the overwritable optical disc according to UDF, there is exemplified a method of using a space bitmap descriptor (SBD), in which the unused state of each area is described in a bitmap format, to manage a space area in a partition to which file data is recorded. However, in a UDF format whose version number is 2.5 and later, since an optical disc whose access type is 1, that is, a read only optical disc is prohibited to record SBD, a type 4 disc has a problem in that it has no compatibility between a data recording apparatus and a replay only apparatus.

To cope with this problem, the embodiment is arranged such that when user data is overwritten to a recording medium, for example, an overwritable optical disc and the like such as DVD-RW, DVD+RW, CD-RW according to UDF, the user data is overwritten while managing a space area by a format which does not conflict with the prohibition, which prohibits recording of SBD, of the UDF format having the version number 2.5 and later indicating that SBD is not to be recorded.

Specifically, there are contemplated two methods. In one of the methods, overwrite recording is executed while maintaining a space area in a partition by uniquely creating a file or data for describing the space area independently of SBD. In the other of the methods, although overwrite recording is executed to a partition making use of SBD while a disc is loaded, when the disc is discharged, pointer information to SBD is deleted after it is saved as a save file or data so that it is concealed from a replay only apparatus, and then restored when the disc is loaded again. The respective methods will be described below in detail.

B-1. Method of Maintaining the Inside of Partition Using Unique Space Area Description File/Data In the method, to overwrite user data to a recording medium, for example, an overwritable optical disc and the like such as DVD-RW, DVD+RW, CD-RW according to UDF, when a disc is subjected to initialization processing, space area description data for managing a space area of a partition is uniquely created outside of the partition or a space area description file for managing a space area of a partition is uniquely created in the partition.

The format of the contents of the space area description data and the space area description file is not particularly limited as long as they include information for managing a space area on an optical disc. The embodiment has such a data structure that it has a bitmap corresponding to the respective sectors of the optical disc and the number of effective bits. Further, when a corresponding sector is already used, on (that is, value 1) is written to the respective bits in the bit map, whereas when a corresponding sector is unused, off (that is, value 0) is written thereto.

Figure 3:
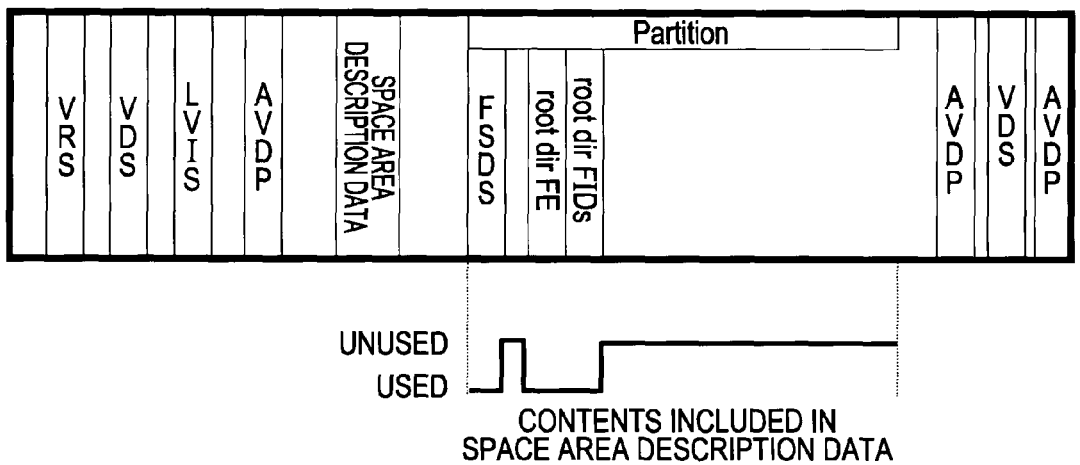
FIG. 3 is a view showing a data layout just after initialization processing is executed to an optical disc when space area description data is uniquely created outside of a partition.

FIG. 3 shows a data layout just after initialization processing is executed to the optical disc when the space area description data is uniquely created outside of the partition.

For example, standard information called VRS (Volume Recognition Sequence) is written from a 16th logic sector from the innermost periphery. VRS is composed of one or a plurality of volume structure descriptors (Volume Structure Descriptors) in which information such as a type, identifier, version information as to a volume structure is described. Since the contents themselves of VRS do not directly relate to the gist of the present invention, they are not explained here in detail.

Further, file system data such as VDS (Volume Descriptor Sequence), LVIS (Logical Volume Integrity Sequence), AVDP (Anchor Volume Descriptor Pointer) is recorded to a logic sector area outside of the partition in which the user data is stored as a file.

VDS is data which describes information as to the contents of a volume structure such as pointer information to a route directory, and the like, and two VDSs are disposed. AVDP is pointer information indicating the two VDSs. LVIS describes the number of files, the number of directories, and the remaining amount of a medium in a partition.

It is permitted in UDF to optionally dispose VDS and LVIS in a logic sector area outside of a partition. However, it is determined as one of the restrictions and indispensable conditions that AVDP is to be recorded to at least two locations of a 256th logic sector, a final recorded logic sector number N, and a logic sector number located 256 sectors before the logic sector number N.

Accordingly, the file data in the partition can be accessed in the sequence of AVDP→VDS→file set descriptor (FSD) →file entry (FE) of route directory→information control block (ICB) of route directory→file identification information descriptor (FID) in route directory→ICB of file→data.

Just after the initialization, a user data file is not yet recorded in the partition, and only a file set descriptor sequence (FSDS) and the FE and FID of the route directory exist. The space area in the partition can be managed as data of such a bitmap format that 1 is set to an unused sector and 0 is written to a used area. In an example shown in FIG. 3, the bitmap data is written as space area description data outside of the partition. VDS includes pointer information to the space area description data. The area, to which the space area description data is recorded, is handled as a used area so that it is not referred to by Unallocated Space Descriptor.

Figure 4:
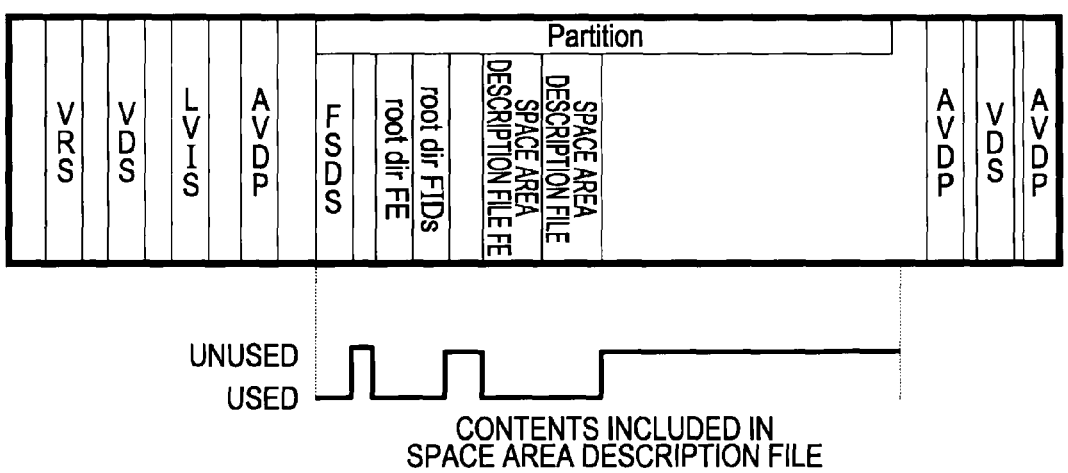
FIG. 4 is a view showing a data layout just after initialization processing is executed to an optical disc when space area description data, to which data for managing a space area is written, is uniquely created in a partition.

Further, FIG. 4 shows a data layout just after the initialization processing is executed to the optical disc when a space area description file, to which data for managing a space area is written, is uniquely created in the partition.

For example, VRS is written from the 16th logic sector from the innermost periphery. Further, file system data such as VDS, LVIS, AVDP is recorded to the logic sector area outside of the partition in which user data is stored as a file. Although it is permitted in UDF to optionally dispose VDS and LVIS in the logic sector area outside of the partition, it is determined that AVDP is to be recorded to at least two locations of a 256th logic sector, a final recorded logic sector number N, and a logic sector number located 256 sectors before the logic sector number N (as described above).

The space area in the partition can be managed as data of such a bitmap format that 1 is set to an unused sector and 0 is written to a used area. Just after the initialization, the user data file is not yet record in the partition, and only FSDS, the FE and FID of the route directory, a space area description file for storing data showing a space area by a bit map, and the FE to the space area description file exist in the partition. In an example shown in FIG. 4, bitmap data, in which a space area description file and an area used to record the FE thereof are also shown by a bit 0, is written to a space area description file.

Figure 5:
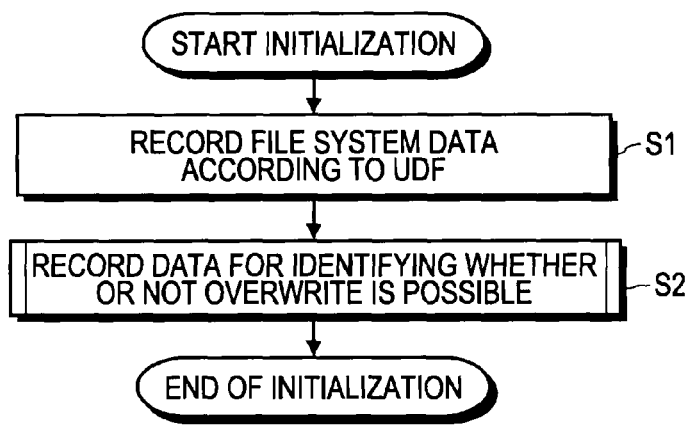
FIG. 5 is a flowchart showing a processing procedure for formatting an optical disc.

FIG. 5 shows a processing procedure for formatting the optical disc in the format of a flowchart.

First, file system data according to UDF is recorded on the disc (step S1). Specifically, VRS is written from, for example, the 16th logic sector from the innermost periphery. Further, the file system data such as VDS, LVIS, AVDP is recorded to the logic sector area outside of the partition in which the user data is stored as the file.

Then, record possible or impossible identification data defined separately is recorded (step S2), thereby the disc formatting is finished.

Figure 6:
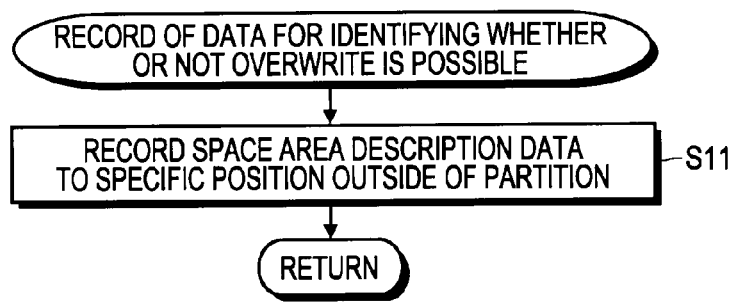
FIG. 6 is a view showing a procedure for recording space area description data to a specific position outside of a partition.

The record possible or impossible identification data is data as to an unused area in the partition, the space area in the partition is shown by a bitmap format. As shown in FIG. 3, the record possible or impossible identification data can be recorded as the space area description data outside of the partition. In this case, in the record processing of the overwrite possible or impossible identification data at step S2, the space area description data is recorded to a specific position outside of the partition (refer to FIG. 6).

Figure 7:
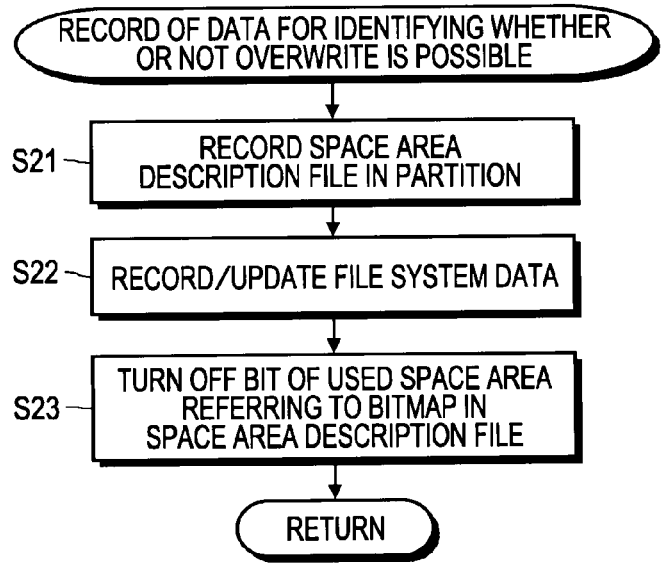
FIG. 7 is a flowchart showing a procedure for recording a space area description file in a partition.

Further, as shown in FIG. 4, the record possible or impossible identification data can be recorded as a space area description file in the partition. FIG. 7 shows a processing procedure in this case in the format of a flowchart.

First, a space area description file is recorded in the partition to manage the space area (step S21).

Next, record/update processing of file system data such as describing FE to the space area description file to VDS and updating the number of files and the remaining amount of the medium in LVIS is executed (step S22).

Then, the bits of a used area are turned off referring to a bitmap in the space area description file (step S23). For example, the value of a bit position corresponding to the recording area of the space area description file is rewritten to 0.

Figure 8:
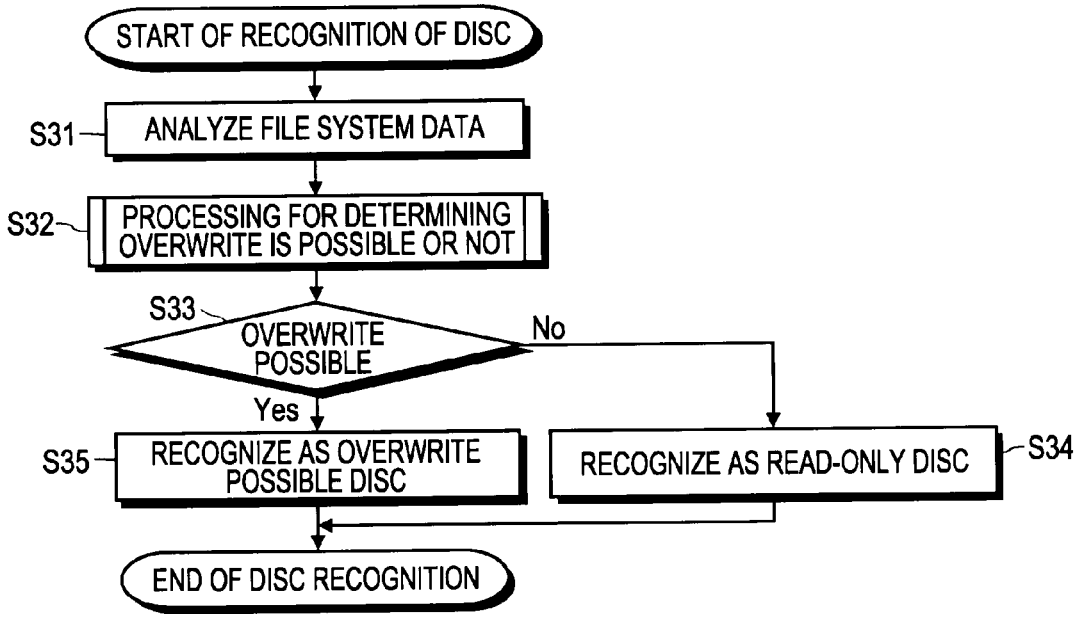
FIG. 8 is a flowchart showing a processing procedure executed when a disc is newly loaded.

FIG. 8 shows a processing procedure executed when a disc is newly loaded in the format of a flowchart.

First, the file system data is obtained by a sequence of AVDP→VDS and analyzed (step S31).

Next, as shown in FIG. 3 or 4, the space area description data or the space area description file which are recorded is obtained, and determination processing is executed to determine whether or not data can be overwritten in a partition of a disc being loaded (step S32). The determination processing is separately defined.

When it is determined that the overwrite is impossible, the disc is recognized as a read only disc thereafter (step S34), whereas when it is determined that the overwrite is possible, the disc is recognized as an overwritable disc thereafter (step S35).

Figure 9:
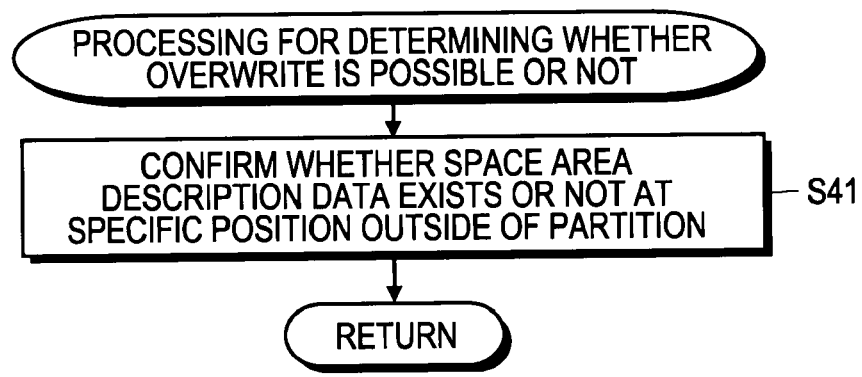
FIG. 9 is a view showing a procedure of processing for determining whether or not data can be overwritten to a disc when the disc is formatted as shown in FIG. 3.

FIG. 9 shows a procedure of overwrite possible or impossible determination processing to the disc executed at S32 of the flowchart shown in FIG. 8. The illustrated processing procedure is applied when the disc is formatted as shown in FIG. 3.

In this case, it is confirmed whether or not the space area description data exists at a specific position outside of the partition (step S41).

Figure 10:
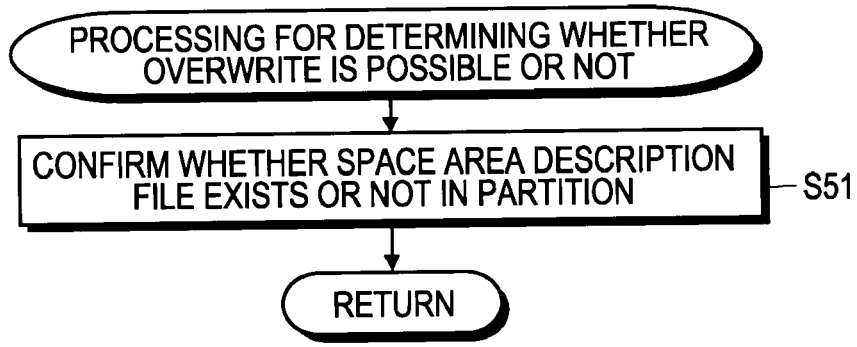
FIG. 10 a view showing a procedure of processing for determining whether or not data can be overwritten to a disc when the disc is formatted as shown in FIG. 4.

Further, FIG. 10 shows other procedure of the overwrite possible or impossible determination processing to the disc executed at step S32 of the flowchart shown in FIG. 8. The illustrated processing procedure is applied when the disc is formatted as shown in FIG. 4.

In this case, it is confirmed whether or not the space area description file exists in the partition (step S51).

Figure 11:
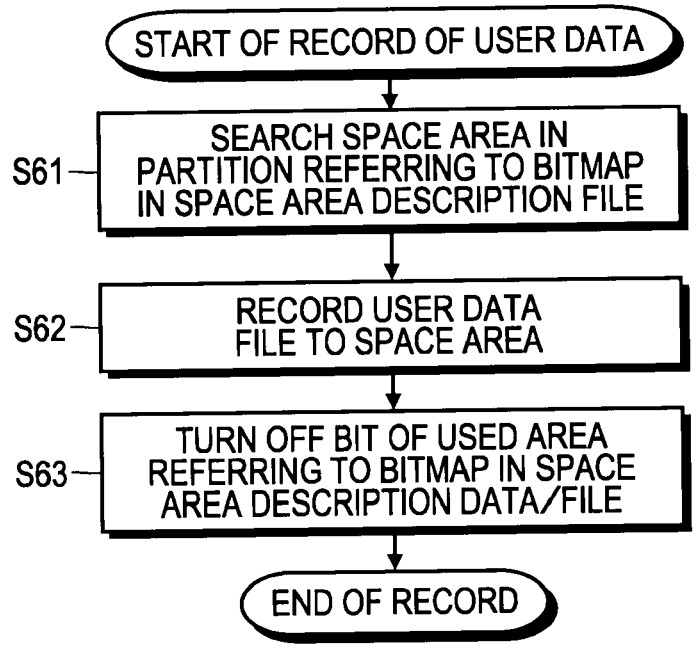
FIG. 11 is a flowchart showing a processing procedure for recording a user data file in a partition of a disc after it is formatted.

FIG. 11 shows a processing procedure for recording the user data file to the partition of the disc after the disc is formatted in the format of a flowchart.

First, the space area description file is read out from the specific position outside the partition or from inside of the partition, and a space area to which the user data can be written is searched referring to the bitmap data (step S61).

Next, the user data file is recorded to the space area (step S62). Further, in parallel to the operation, file system data record/update processing such as describing FE to the user data file to VDS and updating the number of files and the remaining amount of the medium in LVIS is executed (step S63).

Then, a bit at a bit position corresponding to the area to which the user data file is recorded at S62 is turned off referring to the bitmap in the space area description data or the space area description file (step S64).

In the processing procedure shown in FIG. 11, the operation is executed such that each time one user data file is recorded in the partition, the file system is recorded/updated. However, it is also possible to temporarily store file system information necessary to overwrite at least two user data files to a memory such as the temporary memory medium 6 while the optical disc is loaded on the recording unit 4 and to record/update them together at the timing when the disc is discharged.

Figure 12:
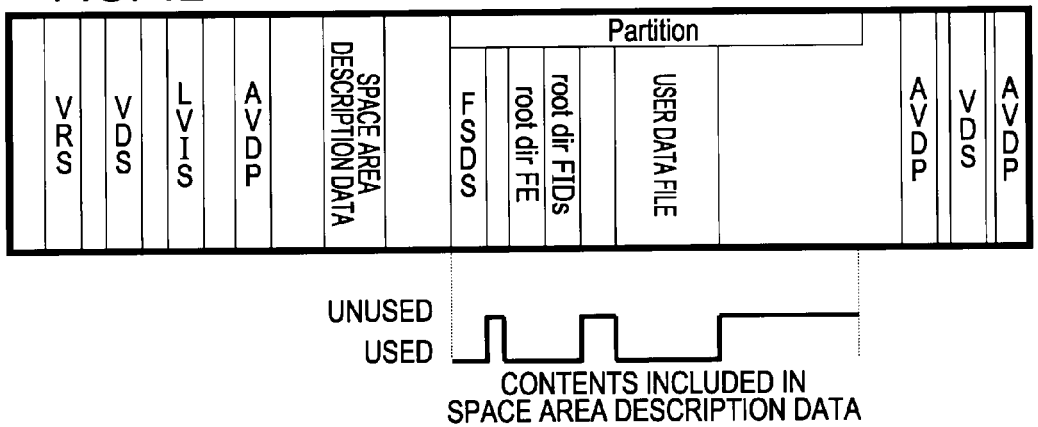
FIG. 12 is a view showing a data layout after a user data file is recorded on the data layout shown in FIG. 3.

FIG. 12 shows a data layout after a user data file is newly recorded on the data layout shown in FIG. 3. In this case, when the bitmap of the space area description data outside of the partition is referred to, a bit is turned off at the bit position corresponding to the overwritten user data file.

Figure 13:
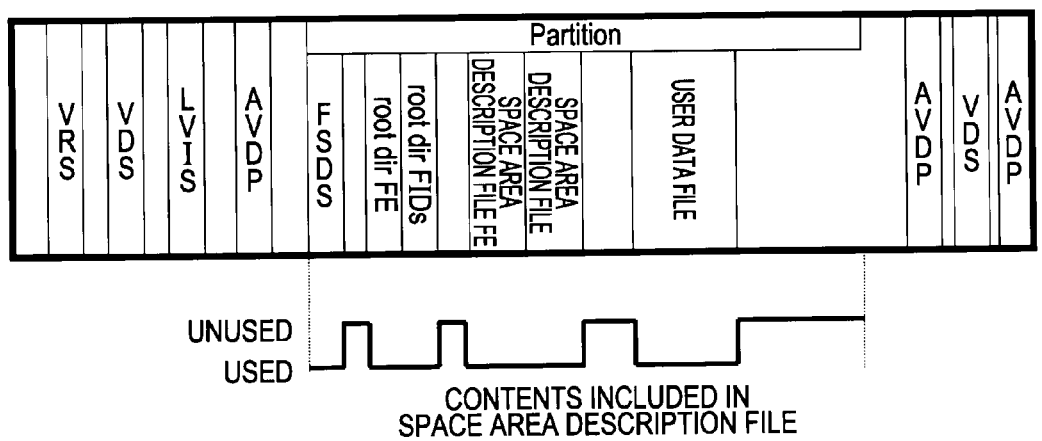
FIG. 13 is a view showing a data layout after a user data file is newly recorded on the data layout shown in FIG. 4.

Further, FIG. 13 shows a data layout after a user data file is newly recorded on the data layout shown in FIG. 4. In this case, when the bitmap in the space area description file in the partition is referred to, a bit is turned off at the bit position corresponding to the overwritten user data file.

B-2. Method of Concealing SBD from Replay Only Apparatus by Saving Pointer Information to SBD when Disc is Discharged In this method, when the optical disc is initialized in a format according to UDF, SBD is recorded. Further, user data is overwritten to a partition making use of SBD regardless of an access type during a period from the time the optical disc is loaded on the apparatus to the time the optical disc is taken out.

Then, when the optical disc 25 is taken out from the recording unit 4, pointer information to SBD recorded to a partition descriptor (PD) in VDS is backuped to a unique SBD pointer information save file in a partition or to unique SBD pointer information save data outside of the partition and then deleted from VDS.

Further, when the optical disc 25 is loaded on the recording unit 4, it is confirmed whether or not the SBD pointer information save file or the SBD pointer information save data, to which the pointer information to SBD is backuped, exist when file system data is recognized. When the file or the data is detected, SBD is restored, and the user data is continuously overwritten to the partition while maintaining SBD.

Thus, according to the method, the user data is overwritten while managing a space area in the partition making use of SBD. However, when the optical disc is taken out from the recording unit 4, since SBD can not be seen from the replay apparatus, it does not conflict with the prohibition, which prohibits recording of SBD, of the UDF format having the version number of 2.5 and later. Further, when the optical disc 25 is loaded again on the recording unit 4, the user data can be continuously overwritten to the optical disc by restoring SBD.

Figure 14:
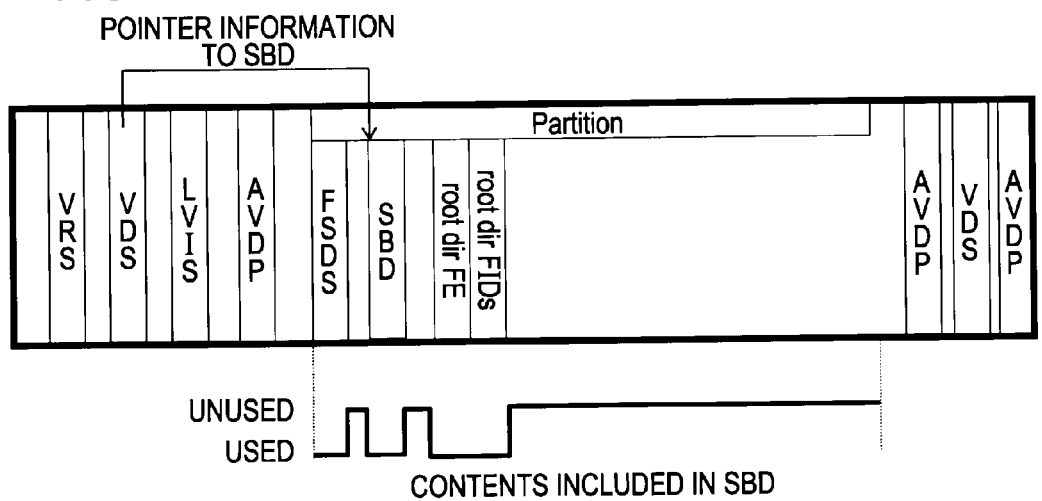
FIG. 14 is a view showing a data layout just after initialization processing is executed to an optical disc when SBD is used.

FIG. 14 shows a data layout just after the initialization processing is executed to the optical disc when SBD is used.

For example, VRS is written from the 16th logic sector from the innermost periphery. Further, file system data such as VDS, LVIS, and AVDP is recorded to a logic sector area outside of the partition in which user data is stored as a file. Although it is permitted in UDF to optionally dispose VDS and LVIS in the logic sector area outside of the partition, it is determined that AVDP is to be recorded to at least two locations of the 256th logic sector, the final recorded logic sector number N, and the logic sector number located 256 sectors before the logic sector number N (as described above).

Just after the initialization, the user data file is not yet recorded in the partition, and FSDS, FE and FID of the route directory and a space area are recorded to SBD. The space area in the partition is managed in SBD as data shown by a bitmap, and a bit 0 is also recorded to the recording area in which SBD is recorded. PD (described above), which is pointer information to SBD, is recorded in VDS.

Figure 15:
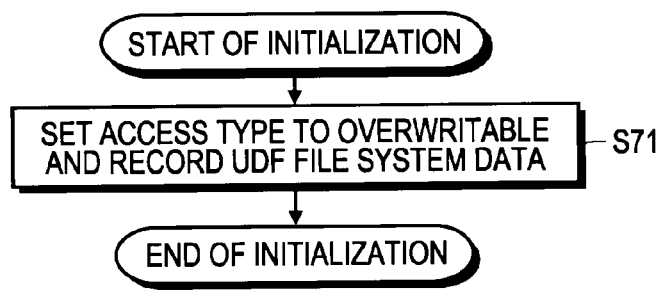
FIG. 15 is a view explaining a processing procedure for initializing a disc when a space area in a partition is managed using SBD.

FIG. 15 shows a disc initialization procedure in this case. The access type of the disc is made overwritable, and UDF file system data is recorded (step S71). That is, the file system data such as VDS, LVIS, and AVDP is recorded to the logic sector area outside of the partition as well as SBD is recorded in the partition.

Figure 16:
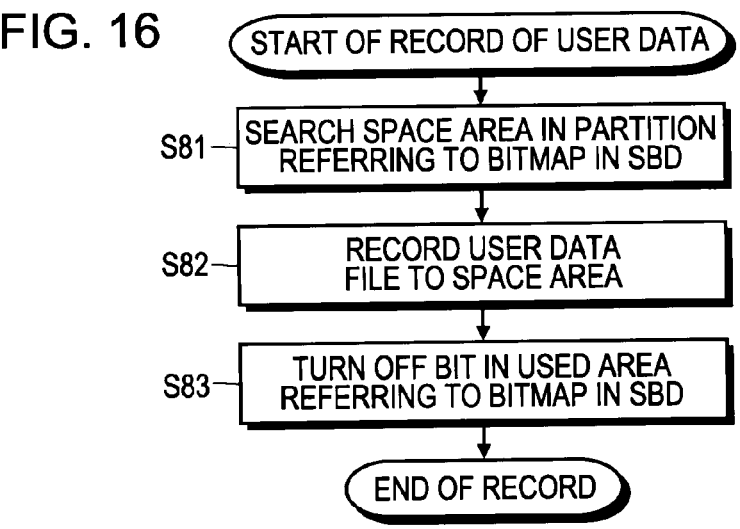
FIG. 16 is a flowchart showing a processing procedure for recording a user data file in a partition of a disc after it is formatted.

FIG. 16 shows a processing procedure for recording the user data file in the partition of the disc after it is formatted in the format of a flowchart.

First, a space area, in which the user data can be written, is searched referring to the bitmap recorded to SBD (step S81).

Next, the user data file is recorded to the space area (step S82). Further, in parallel to the operation, file system data record and update processing such as describing FE to the user data file to VDS and updating the number of files and the remaining amount of the medium in LVIS is executed.

Then, the bit at the bit position corresponding to the area, in which the user data file and FE thereof are recorded at step S82, is turned off referring to the bitmap in SBD.

In the processing procedure shown in FIG. 16, the operation is executed such that each time one user data file is recorded in the partition, the file system is recorded/updated. However, it is also possible to temporarily store file system information necessary to overwrite at least two user data files to a memory such as the temporary memory medium 6 while the optical disc is loaded on the recording unit 4 and to record/update them together at the timing when the disc is discharged.

Figure 17:
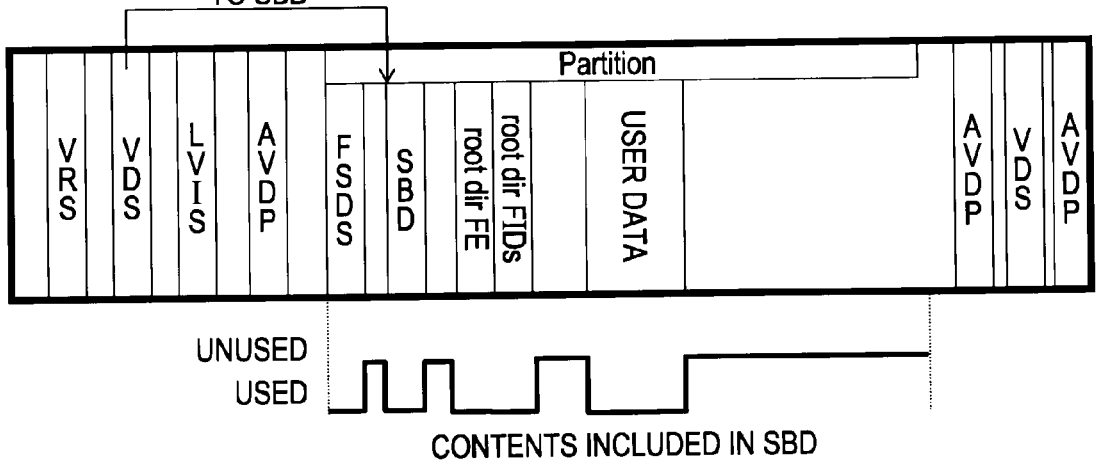
FIG. 17 is a view showing a data layout after a user data file is newly recorded on the data layout shown in FIG. 14.

FIG. 17 shows a data layout after a user data file is recorded on the data layout shown in FIG. 14. In this case, when the bitmap of SBD in the partition is referred to, a bit is turned off at the bit position corresponding to the overwritten user data file.

In the UDF format whose version number is 2.5 and later, an optical disc whose access type is 1, that is, a read only optical disc is prohibited to record SBD. Thus, when the optical disc 25 is taken out from the recording unit 4, a manipulation for concealing SBD is applied to the replay only apparatus. Specifically, the pointer information to SBD recorded to the partition descriptor (PD) in VDS is backupped to unique SBD pointer information save data outside of the partition or to unique SBD pointer information save file in the partition and then deleted from VDS.

FIG. 18 shows a processing procedure for backupping the pointer information to SBD recorded in the partition descriptor (PD) in VDS as the unique SBD pointer information save data outside of the partition in the format of a flowchart.

The BD pointer information save data for saving the pointer information to SBD recorded to the partition descriptor (PD) in VDS is recorded to a specific position outside of the partition (step S91), and the information of PD is deleted from VDS.

Then, the access type of the disc is set to read only, and the file system data is updated (step S92).

Although SBD itself is left remained in a partition, PD is deleted from VDS. Thus, as long as the information of PD is not restored to VDS from the SBD pointer information save data outside of the partition, existence of SBD is concealed (refer to FIG. 19). Accordingly, in the read only optical disc, since this is equivalent to keep the UDF format whose version number is 2.5 and later and which prohibits recording of SBD, the disc discharged from the recording unit 4 can be used by being loaded on the replay only apparatus.

Further, FIG. 20 shows a processing procedure for backupping the pointer information to SBD recorded in the partition descriptor (PD) in VDS as the unique SBD pointer information save data outside of the partition in the format of a flowchart.

A space area, in which the user data can be written, is searched referring to the bitmap recorded to SBD. Then, a SBD pointer information save file is created to save the pointer information to SBD recorded to the partition descriptor (PD) in VDS, the file and the file entry (FE) thereof are recorded to the space area searched in the partition (step 101), and the information of PD is deleted from VDS.

Next, file system data record/update processing such as describing FE to the SBD pointer information save file to VDS and to updating the number of files and the remaining amount of the medium in LVIS is executed (step S102).

Next, a bit at the position corresponding to the area in which the SBD pointer information save file and FE thereof are recorded at step S102, is turned off referring to the bitmap in SBD (step S103).

Then, the access type of the disc is set to read only, and the file system data is further updated (step S104).

Although SBD itself is left remained in the partition, PD is deleted from VDS. Thus, as long as the information of PD is not restored to VDS from the SBD pointer information save data in the partition, existence of SBD is concealed (refer to FIG. 21). Accordingly, in the read only optical disc, since this is equivalent to keep the UDF format whose version number is 2.5 and later and which prohibits recording of SBD, the disc discharged from the recording unit 4 can be used by being loaded on the replay only apparatus.

On the other hand, when the optical disc 25 is loaded on the recording unit 4, whether or not the SBD pointer information save file or the SBD pointer information save data, to which the pointer information to SBD is backupped, exists at the time the file system data is recognized, and when the file or the data is detected, PD is restored to VDS to thereby restore a state in which overwriting can be executed while maintaining SBD.

Figure 22:
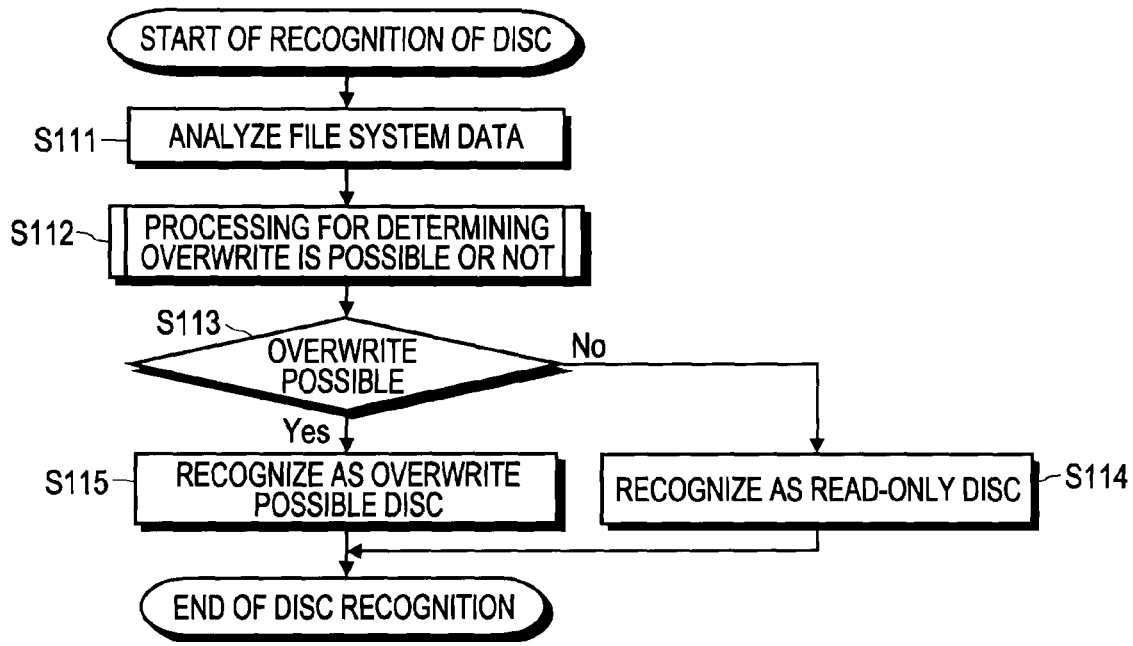
FIG. 22 is a flowchart showing a processing procedure to be executed when a disc is newly loaded on the recording unit 4.

FIG. 22 shows a processing procedure executed when a disc is newly loaded on the recording unit 4 in the format of a flowchart.

First, the file system data is obtained in the sequence of AVDP→VDS and analyzed (step S111).

Next, it is determined whether or not data can be overwritten in the partition of a disc being loaded by determination processing defined separately (step S112). The procedure of the determination method is different depending on whether SBD pointer information is saved as data outside of the partition data or as data in the partition.

When it is determined that the overwrite is impossible, the disc is recognized as a read only disc thereafter (step S114), whereas when it is determined that the overwrite is possible, the disc is recognized as an overwritable disc thereafter (step S115).

Figure 23:
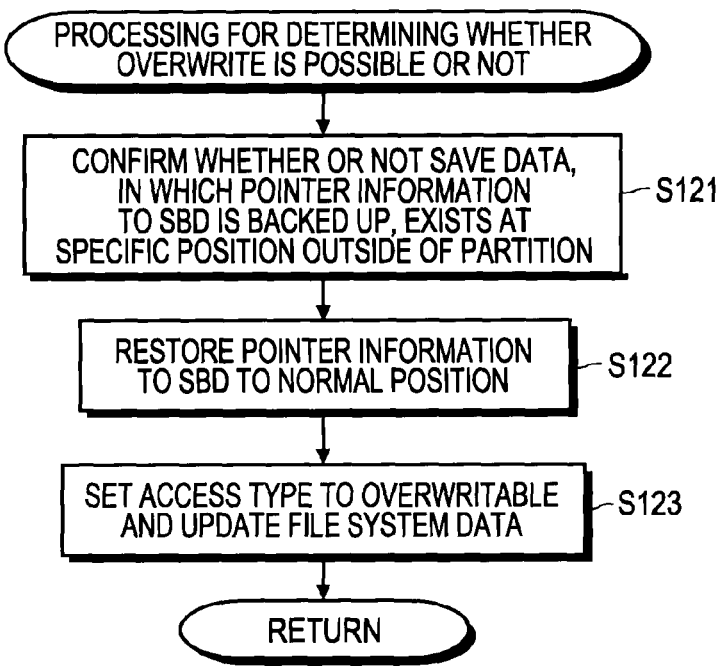
FIG. 23 is a view showing a procedure of processing for determining whether or not data can be overwritten to a disc when SBD pointer information is saved to the SBD pointer information save data outside of the partition.

FIG. 23 shows procedure of the overwrite possible or impossible determination processing to a disc executed at step S112 of the flowchart shown in FIG. 22. The illustrated processing procedure is applied when the SBD pointer information is saved as data outside of the partition as shown in FIG. 19.

In this case, it is confirmed whether or not the SBD pointer information save data exists at a specific position outside of the partition (step S121).

When the existence of the SBD pointer information save data is confirmed, the pointer information to SBD is restored as PD information at a normal position, that is, in VDS (step S122).

Then, the access type of the disc is set to OverWritable, and the file system data is updated (step S123).

Figure 24:
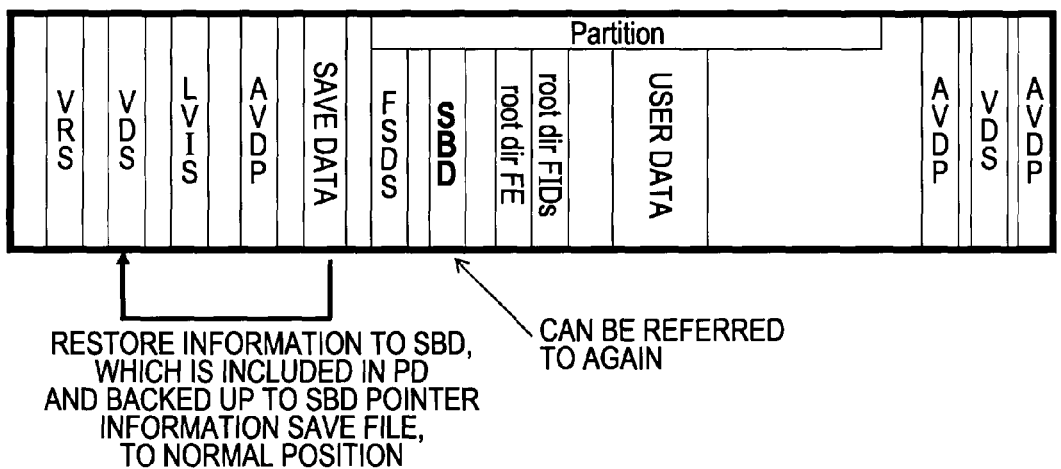
FIG. 24 is a view showing how PD information is restored from the SBD pointer information save data outside of the partition to VDS through the processing for determining whether or not data can be overwritten shown in FIG. 23.

As shown in FIG. 19, when the disc is discharged, only PD is deleted from VDS, and SBD itself is left remained in the partition. When the PD information is restored from the SBD pointer information save data outside of the partition to VDS through the overwrite possible or impossible determination processing shown in FIG. 23, SBD can be restored to a reference possible state again (refer to FIG. 24). Thereafter, a file can be overwritten in the partition of the disc while maintaining SBD.

Figure 25:
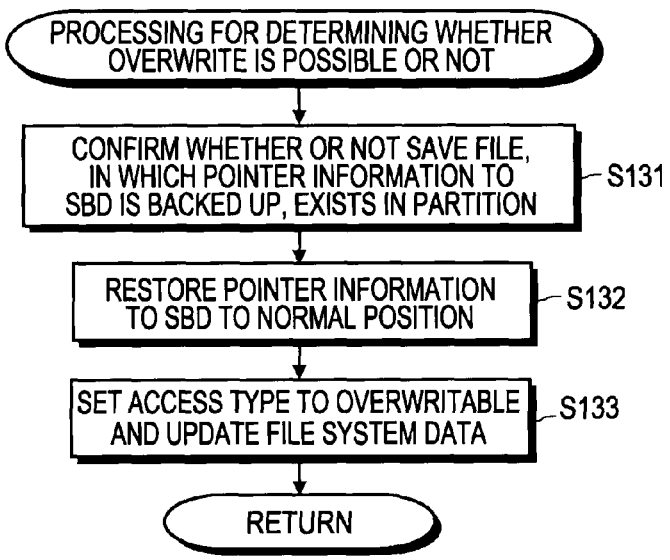
FIG. 25 is a view showing a procedure of processing for determining whether or not data can be overwritten to a disc when the SBD pointer information is saved to the SBD pointer information save file in the partition.

Further, FIG. 25 shows a procedure of the overwrite possible or impossible determination processing to the disc executed at step S112 of the flowchart shown in FIG. 22. The illustrated processing procedure is applied when the SBD pointer information is saved as a file in the partition as shown in FIG. 21.

In this case, it is confirmed whether or not the SBD pointer information save file exists (step S131).

When the existence of the SBD pointer information save data is confirmed, the pointer information to SBD is restored as the PD information at the normal position, that is, in VDS (step S132).

Then, the access type of the disc is set to OverWritable, and the file system data is updated (step S133).

Figure 26:
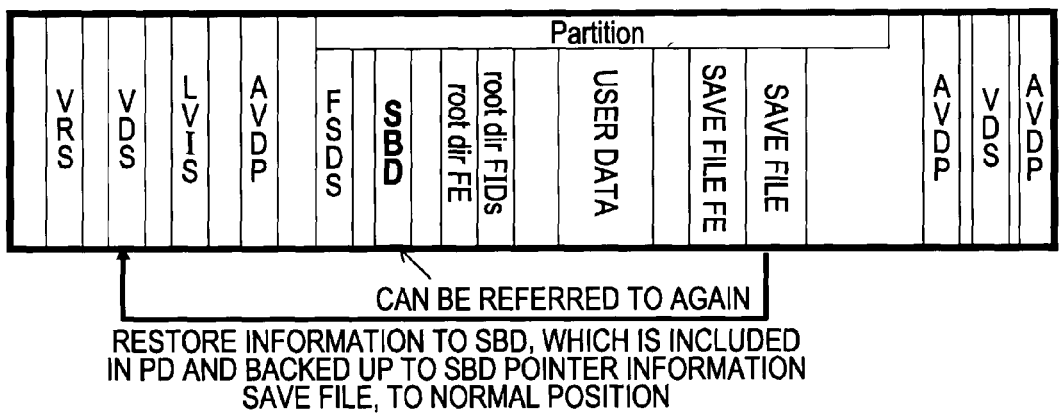
FIG. 26 is a view showing how the PD information is restored to VDS from the SBD pointer information save file in the partition to VDS through the processing shown in FIG. 25 for determining whether or not data can be overwritten.

As shown in FIG. 21, when the disc is discharged, only PD is deleted from VDS, and SBD itself is left remained in the partition. When the PD information is restored from the SBD pointer information save file in the partition to VDS through the overwrite possible or impossible determination processing shown in FIG. 25, SBD can be restored to a reference possible state again (refer to FIG. 26), and thereafter a file can be overwritten to the partition again while maintaining SBD.

INDUSTRIAL APPLICABILITY

The present invention is described above in detail referring to the specific embodiment. However, it is apparent that persons skilled in the art can correct the embodiment or substitute other embodiment for it within the scope which does not depart from the gist of the present invention.

Although the description explains mainly explain the embodiment to which the present invention is applied when an overwrite is executed to an overwritable optical disc according to the UDF format defined by OSTA, the gist of the present invention is by no means limited thereto. When a file system format, in which such a similar restriction that information such as SBD as to a space area in a partition which is necessary to overwrite user data must be concealed from a replay only format exists, is applied, a similar advantage can be obtained by applying the present invention. Further, the type of a recording medium is not particularly limited to the optical disc.

In short, since the present invention is disclosed as an example, the contents disclosed in the description should not be interpreted restrictively. That is, the scope of the appended claims should be taken into consideration to judge the gist of the present invention.

The invention claimed is:

1. A data recording apparatus for executing overwrite to a disc having a partition on which a file can be overwritten according to a predetermined file system format, wherein, in the predetermined file system format, it is permitted to record space area description information, which manages a space area in a partition when the overwrite is used, in the partition as well as it is prohibited to record the space area description information in the partition when replay only is used, the data recording apparatus comprising:

disc initialization means for recording the space area description information, which manages the space area in the partition, on the disc when the disc is initialized;

data recording means for searching a space area in the partition referring to the space area description information recorded on the disc and recording file data to the searched space area as well as updating the description information;

space area description information concealing means for concealing the space area description information so as to be used for replay only; and disc discrimination means for detecting whether or not a disc is overwritable when the disc is loaded and determining whether or not overwrite can be executed making use of the space area description information.

2. The data recording apparatus according to claim 1, wherein it is determined in the predetermined file system format that the space area description information in which recording in the partition is prohibited when the replay only is used, has a specific name;

the disc initialization means records the space area description information for managing the space area in the partition as data at a specific position outside of the partition or records the space area description information in the partition as a file having a file name other than the specific name; and the disc discrimination means discriminates whether or not the disc is overwritable depending on whether the space area description information, which manages the space area in the partition, exists at the specific position outside of the partition of the loaded disc or a file, to which the space area description information having the file name other than the specific name is recorded, exist.

3. The data recording apparatus according to claim 1, wherein the predetermined file system format determines that a volume descriptor sequence (VDS), which is composed of a set of information as to a volume structure including pointer information to a route directory in the partition, is disposed outside of the partition and that point information to the space area description information whose record in the partition is prohibited when the replay only is used is recorded in the volume descriptor sequence (VDS);

the disc initialization means records the space area description information in the partition when the disc is initialized;

the data recording means updates the partition description information in the partition when the file data is recorded in the partition;

the space area description information concealing means deletes the point information to the space area description information recorded in the volume descriptor sequence (VDS) after the point information to the space area description information in the partition is backupped; and depending on whether or not the loaded disc has a backup of the point information to the space area description information as well as the backupped point information is restored in the volume descriptor sequence (VDS) so that the space area description information in the partition can be used.

4. The data recording apparatus according to claim 3, wherein the space area description information concealing means records the backup of the point information to the space area description information as data at a specific position out of the partition or as a file in the partition as well as reads pointer information to the file entry in the volume descriptor sequence (VDS); and the disc discrimination means discriminates whether or not the disc is overwritable depending on whether backupped data exists at a specific position outside of the partition or pointer information to a backupped file entry exists in the volume descriptor sequence (VDS).

5. The data recording apparatus according to claim 1, wherein the predetermined file system format is UDF (Universal Disc Format) defined by OSTA (Optical Storage Technology Association).

6. A data recording method of executing overwrite to a disc having a partition on which a file can be overwritten according to a predetermined file system format, wherein, in the predetermined file system format, it is permitted to record space area description information, which manages a space area in a partition when the overwrite is used, in the partition as well as it is prohibited to record the space area description information in the partition when replay only is used, the data recording method comprising:
- recording the space area description information, which manages the space area in the partition, on the disc when the disc is initialized;
- searching a space area in the partition referring to the space area description information recorded on the disc and recording file data to the searched space area as well as updating the description information;
- concealing the space area description information so as to be used for replay only; and
- detecting whether or not a disc is overwritable when the disc is loaded and determining whether or not overwrite can be executed making use of the space area description information.

7. A non-transitory computer readable medium encoded with a computer program, which is described in a computer-readable format to execute processing for executing overwrite to a disc having a partition on which a file can be overwritten on a computer according to a predetermined file system format, wherein, in the predetermined file system format, it is permitted to record space area description information, which manages a space area in a partition when the overwrite is used, in the partition as well as it is prohibited to record the space area description information in the partition when replay only is used, the computer program causing a computer to execute a method comprising:
- recording the space area description information, which manages the space area in the partition, on the disc when the disc is initialized;
- searching a space area in the partition referring to the space area description information recorded on the disc and recording file data to the searched space area as well as updating the description information;
- concealing the space area description information so as to be used for replay only; and
- detecting whether or not a disc is overwritable when the disc is loaded and determining whether or not overwrite can be executed making use of the space area description information.

8. A data recording apparatus for executing overwrite to a disc having a partition on which a file can be overwritten according to a predetermined file system format, wherein, in the predetermined file system format, it is permitted to record space area description information, which manages a space area in a partition when the overwrite is used, in the partition as well as it is prohibited to record the space area description information in the partition when replay only is used, the data recording apparatus comprising:
- a disc initialization unit configured to record the space area description information, which manages the space area in the partition, on the disc when the disc is initialized;
- a data recorder configured to search a space area in the partition referring to the space area description information recorded on the disc and recording file data to the searched space area as well as updating the description information;
- a space area description information concealing unit configured to conceal the space area description information so as to be used for replay only; and
- a disc discrimination unit, including a processor, configured to detect whether or not a disc is overwritable when the disc is loaded and determining whether or not overwrite can be executed making use of the space area description information.

* * * * *